United States Patent [19]

DuHack

[11] Patent Number: 5,154,394
[45] Date of Patent: Oct. 13, 1992

[54] SOLENOID OPERATED VALVE WITH IMPROVED FLOW CONTROL MEANS

[75] Inventor: Michael R. DuHack, Indianapolis, Ind.

[73] Assignee: Emerson Electric Co., St. Louis, Mo.

[21] Appl. No.: 716,319

[22] Filed: Jun. 17, 1991

[51] Int. Cl.⁵ ............................................. F16K 47/08
[52] U.S. Cl. ..................................... 251/120; 138/41; 138/45; 138/46; 251/129.15
[58] Field of Search ............... 138/45, 46, 41; 251/45, 251/46, 120, 129.15

[56] References Cited

U.S. PATENT DOCUMENTS

| | | |
|---|---|---|
| 2,728,355 | 12/1955 | Dahl ..................................... 138/45 |
| 2,815,041 | 12/1957 | Rimsha et al. ........................ 138/45 |
| 2,899,979 | 8/1959 | Dahl et al. ............................ 138/45 |
| 2,936,788 | 5/1960 | Dahl et al. ............................ 138/45 |
| 2,936,790 | 5/1960 | Dahl et al. ............................ 138/45 |
| 3,077,903 | 2/1963 | Honsinger ............................ 138/45 |
| 4,248,270 | 2/1981 | Ostrowski ........................... 251/120 |
| 4,667,700 | 5/2987 | Buzzi .................................... 138/45 |
| 4,889,316 | 12/1989 | Donahue, Jr. ................. 251/129.15 |

Primary Examiner—George L. Walton
Attorney, Agent, or Firm—Robert F. Meyer

[57] ABSTRACT

A fluid flow control disc has a central passage for the flow of fluid. The disc has a peripheral lip seal that insures that the fluid flow will not by pass the central passage.

5 Claims, 1 Drawing Sheet

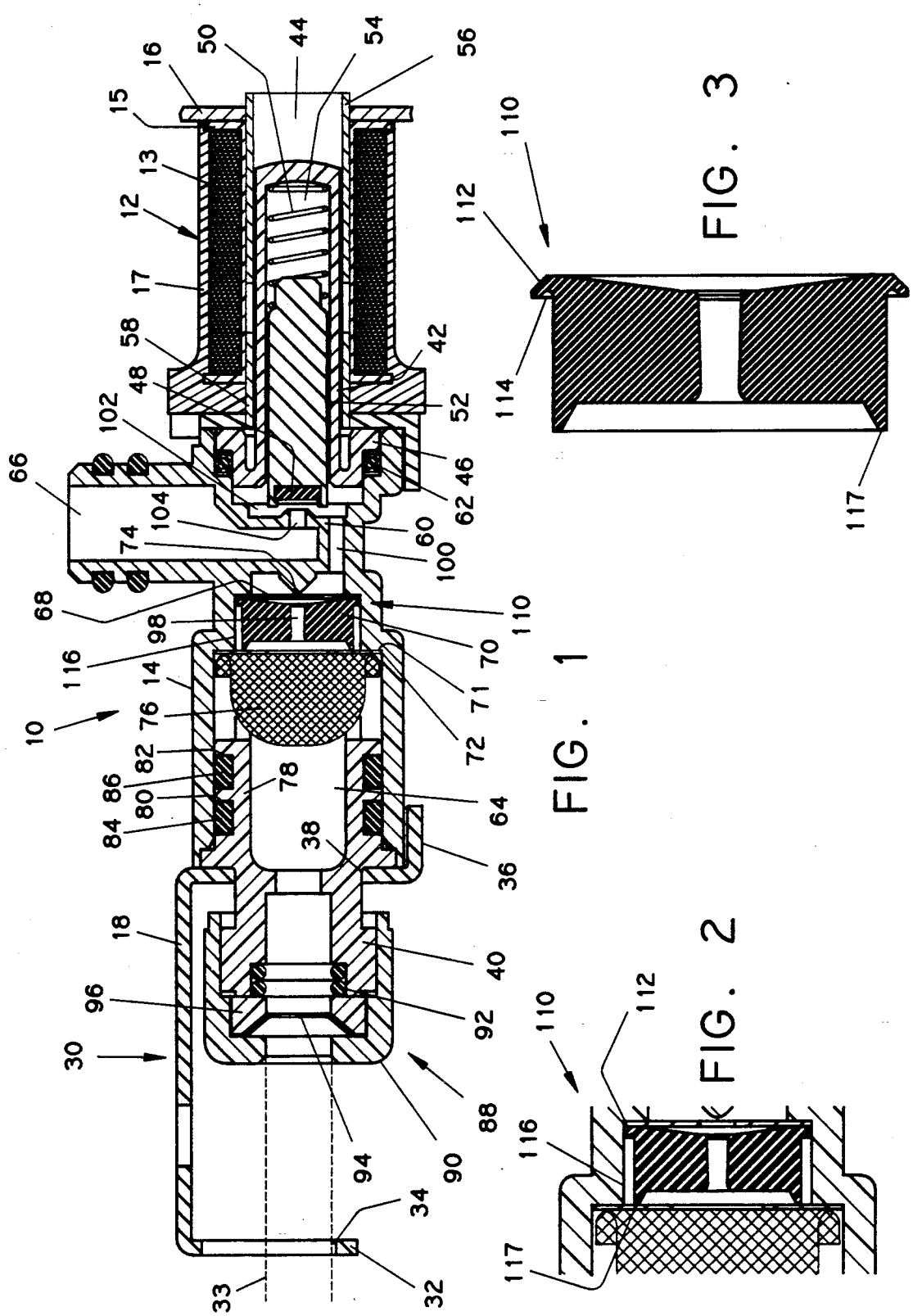

SOLENOID OPERATED VALVE WITH IMPROVED FLOW CONTROL MEANS

BACKGROUND OF THE INVENTION

The present invention pertains to a solenoid operated flow control valve and more particularly to such a valve wherein means are provided for a more precise elastomeric flow control.

In U.S. Pat. No. 4,889,316 there is described and claimed a solenoid operated flow-control valve that is particularly useful in refrigerators with an icemaker. The present invention represents an improvement over such valve in that its flow control means is provided with a means providing more precise elastomeric flow through the valve.

SUMMARY OF THE INVENTION

Accordingly there is provided a solenoid operated flow control valve which in general comprises a valve body having a fluid flow path between inlet and outlet means of the valve, a solenoid operated valve movably positioned in the fluid flow path to open and close the fluid flow path, and a flow control disc in the fluid flow path having a central passage there through, the flow control disc including sealing means preventing bypass flow around it.

DESCRIPTION OF THE DRAWINGS

FIG. 1 is a cross section of a solenoid operated valve employing the invention.

FIG. 2 is an enlarged cross section of a flow control of the valve.

FIG. 3 is enlarged cross section of the flow control of FIG. 2.

DETAILED DESCRIPTION OF THE INVENTION

Referring to FIG. 1, there is shown a solenoid operated valve 10. Valve 10 has a solenoid coil assembly 12 which is connected to valve body 14 by a frame 26. Body 14 carries a mounting bracket 18 at its inlet end 30 which is generally C-shaped with its bottom leg 32 having an aperture 34 through which a fluid supply line 33 can be inserted. The top leg 36 has aperture 38 that is sized to carry inlet 40 to the valve body. Bracket 18 serves as a mounting bracket and a strain relief for the fluid supply line 33.

A guide tube assembly 42 is carried in a longitudinally extending aperture 44 in the coil assembly 12. Coil assembly 12 includes a magnet wire 13 carried on a bobbin 15 and encapsulated in a dust cover 17. A spring 50 and a magnetically responsive armature 52 are carried within a bore 54 in guide tube assembly 42 so that magnetically responsive armature 52 will respond to magnetic fields induced by pole pieces 56 and 58 of the coil assembly 12. Armature 52 includes a rubber seal or stopper 48. The magnetically responsive armature sealingly engages a valve seat 60 located within the valve body 14. The guide tube body 44 has a step shaped outside diameter 46, to allow a seal such as O-ring 62 to be placed around the guide tube to prevent leakage between the guide tube assembly 42 and the valve body 14. Valve body 14 has an inlet water channel 64 and outlet water channel 66 integrally formed therein. Armature 52 may interrupt flow between the inlet 64 and outlet 66 channels by sealingly engaging the valve seat 60. Precise fluid flow through valve body 14 is provided by solenoid valve components valve seat 68, a flow control disc 70 washer 72, a diffusion 74, and a screen 76.

At inlet end 30 of the valve body 14 the inside diameter of the valve body is sized to snugly receive the outside diameter of inlet 40. The portion 78 of the inlet inserted into the valve body has a pair of annular grooves 80 and 82 extending therearound to permit seals 84 and 86 to be inserted to prevent fluid leakage. Inlet 40 is provided with a quick connect/disconnect standard inlet nut component such as a thermoplastic fitting 88. Therefore the inlet 40 is externally threaded to receive an internally threaded cap or nut 90. Within the interior of the quick disconnect fitting 88 are seals 92, a rip ring 94 and a spacer 96 so that the outside surface of a water inlet line 32 may be sealingly secured within the inlet upon tightening of the nut 90.

In operation, after fluid supply line 33 has been connected to grip ring 94, fluid is supplied to the valve from a fluid source (not shown). The fluid flows through screen 76 to be filtered in accordance with the mesh size of the screen. The fluid then flows through washer 72, passage 98 of flow control 70, and seat 68. The fluid is then radially diffused by diffuser 74 to flow through a plurality of passages 100 to chamber 102. When field coil 12 is energized, armature 52, as shown in FIG. 1, moves stopper 48 away from valve seat 60 against the pressure of spring 50 and fluid pressure from fluid in chamber 102. The fluid then flows through central passage 200 and out outlet 66. When field coil 12 is de-energized, spring 50 fores armature 52 to move stopper 48 against valve seat 60 to stop the flow of fluid.

As shown in U.S. Pat. No. 4,889,316 flow control disc 70 utilizes a central passage 98 which provides a more reliable elastomeric flow. In accordance with the present invention there is provided, a sealing means 110 to insure a seal against bypass flow that often occurs around disc 70 and valve seat 68. As more clearly shown in FIGS. 2 and 3 sealing means 110 includes a lip seal 112 extending around disc 70 and bearing against valve body 14. As better shown in FIG. 3, the lip seal forms an acute angle 114 with the outer wall of disc 70 to provide more flexibility. With this configuration the lip seal between the flow control disc 70 and valve body 14 provides 1) a low compression seal force; 2) the flexibility compensates for imperfections in the flow pocket wall 116 of the valve body; 3) the seal forces increases with pressure; and 4) it centers the passage 98 with valve seat 60 and diffuser 74.

In addition, according to the invention valve seat 68 is a washer fabricated of a metal such as stainless steel which is the preferred construction for accurate and precise flow performance as opposed to an integrally molded or separate plastic seal. The washer 72 is held against flow control disc 70 by a ledge 71 of valve body 14 at the outlet end of passage 98.

Also includes on the flow control disc 70 is a raised rim 117 extending around its periphery at an end opposite the lip end which holds the disc in contact with washer 72 at all times and in all valve orientations.

What is claimed is:

1. A solenoid operated flow control valve comprising a valve body having a fluid flow path between inlet and outlet means of said solenoid operated flow control valve, a solenoid operated valve movably positioned in said fluid flow path to open an close said fluid flow path, and a flow control disc having opposite supporting ends that engage seat means securing said flow control disc within said fluid flow path, one of said support ends defining a lip extending radially therefrom in sealing engagement with a wall of said valve body that is substantially parallel to said fluid flow path, said lip always centering said flow control disc within said fluid flow path so as to maintain said sealing engagement regardless of any momentary backpressure existing form said valve body and continuous inlet pressure that flows into said valve body which acts upon said lip to be forced against said wall to achieve an effective seal therebetween thereby preventing bypass flow around said lip.

2. A solenoid operated flow control valve according to claim 1 wherein said lip forms an acute angle with said flow control disc.

3. A solenoid operated valve according to claim 1 further including a raised rim around said flow control disc at an end opposite said lip.

4. A solenoid operated flow control valve according to claim 1 further including a metal valve seat held against said flow control disc.

5. A solenoid operated valve according to claim 4 wherein said metal valve seat is a washer.

* * * * *